(12) United States Patent
Sciacca

(10) Patent No.: US 6,760,761 B1
(45) Date of Patent: Jul. 6, 2004

(54) SYSTEMS AND METHODS FOR STANDARDIZING NETWORK DEVICES

(75) Inventor: Alan Sciacca, Foxboro, MA (US)

(73) Assignees: Genuity Inc., Cambridge, MA (US); Verizon Corporate Services Group Inc., New York, NY (US)

(*) Notice: Subject to any disclaimer, the term of this patent is extended or adjusted under 35 U.S.C. 154(b) by 0 days.

(21) Appl. No.: 09/535,602

(22) Filed: Mar. 27, 2000

(51) Int. Cl.[7] .................................... G06F 15/177
(52) U.S. Cl. .............. 709/220; 709/220; 709/223; 717/171; 717/176; 717/167
(58) Field of Search .................. 709/220, 225, 709/223, 224, 226, 228, 221; 717/171–173, 176, 178

(56) References Cited

U.S. PATENT DOCUMENTS

| | | | | | |
|---|---|---|---|---|---|
| 5,619,716 A | * | 4/1997 | Nonaka et al. | ............. | 717/167 |
| 5,838,907 A | * | 11/1998 | Hansen | ....................... | 709/220 |
| 5,996,012 A | * | 11/1999 | Jarriel | ........................ | 709/226 |
| 6,105,066 A | * | 8/2000 | Hayes, Jr. | ................... | 709/226 |
| 6,128,730 A | * | 10/2000 | Levine | ........................... | 713/1 |
| 6,170,009 B1 | * | 1/2001 | Mandal et al. | .............. | 709/223 |
| 6,292,941 B1 | * | 9/2001 | Jollands | ...................... | 717/176 |
| 6,308,205 B1 | * | 10/2001 | Carcerano et al. | ......... | 709/221 |
| 6,418,468 B1 | * | 7/2002 | Ahlstrom et al. | ........... | 709/223 |
| 6,567,849 B2 | * | 5/2003 | Ludovici et al. | ............ | 709/223 |
| 6,615,276 B1 | * | 9/2003 | Mastrianni et al. | ........ | 709/250 |
| 6,662,205 B1 | * | 12/2003 | Bereiter | ...................... | 709/201 |

* cited by examiner

*Primary Examiner*—David Wiley
*Assistant Examiner*—Phuoc Nguyen
(74) *Attorney, Agent, or Firm*—Leonard C. Suchyta, Esq.; Joel Wall, Esq.

(57) ABSTRACT

A system facilitates configuration of at least one of multiple network devices (130) of different types. The system includes a configuration database (310), a policies database (320), a configuration generator (330), and a protocol engine (340). The configuration database (310) stores data that defines a configuration for the network device (130). The policies database (320) stores rules for configuring the network device (130). The configuration generator (330) generates a deployable configuration from the data in the configuration database (310) and the rules in the policies database (320). The protocol engine (340) deploys the deployable configuration to the network device (130).

33 Claims, 5 Drawing Sheets

SYSTEMS AND METHODS FOR STANDARDIZING NETWORK DEVICES

BACKGROUND OF THE INVENTION

A. Field of the Invention

The present invention relates generally to communications networks and, more particularly, to systems and methods that standardize an interface for configuration and management of different types of network resources.

B. Description of Related Art

Network devices and resources, such as routers, used to connect to a network, such as the Internet, are managed by a set of rules or policies. The commands used to configure or manage these devices typically differ from device-to-device. For example, a line of devices by one vendor typically requires different commands than devices by another vendor. Even different types of devices by the same vendor may require different commands.

As such, users desiring to connect to the network must adapt their systems to the requirements of the network devices. These users typically have limited knowledge of the different commands required to configure or manage these devices.

A need exists for systems and methods that facilitate the management and configuration of network devices having different command sets.

SUMMARY OF THE INVENTION

Systems and methods consistent with the present invention address this need by providing a policy-based network management protocol that presents a standard interface to users and network managers.

In accordance with the purpose of the invention as embodied and broadly described herein, a system facilitates configuration of at least one of multiple network devices of different types. The system includes a configuration database, a policies database, a configuration generator, and a protocol engine. The configuration database stores data that defines a configuration for the network device. The policies database stores rules for configuring the network device. The configuration generator generates a deployable configuration from the data in the configuration database and the rules in the policies database. The protocol engine deploys the deployable configuration to the network device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention facilitate the configuration and management of network devices of different types by presenting a standard, policy-driven interface to users and network managers.

Exemplary Network

Figure 1:
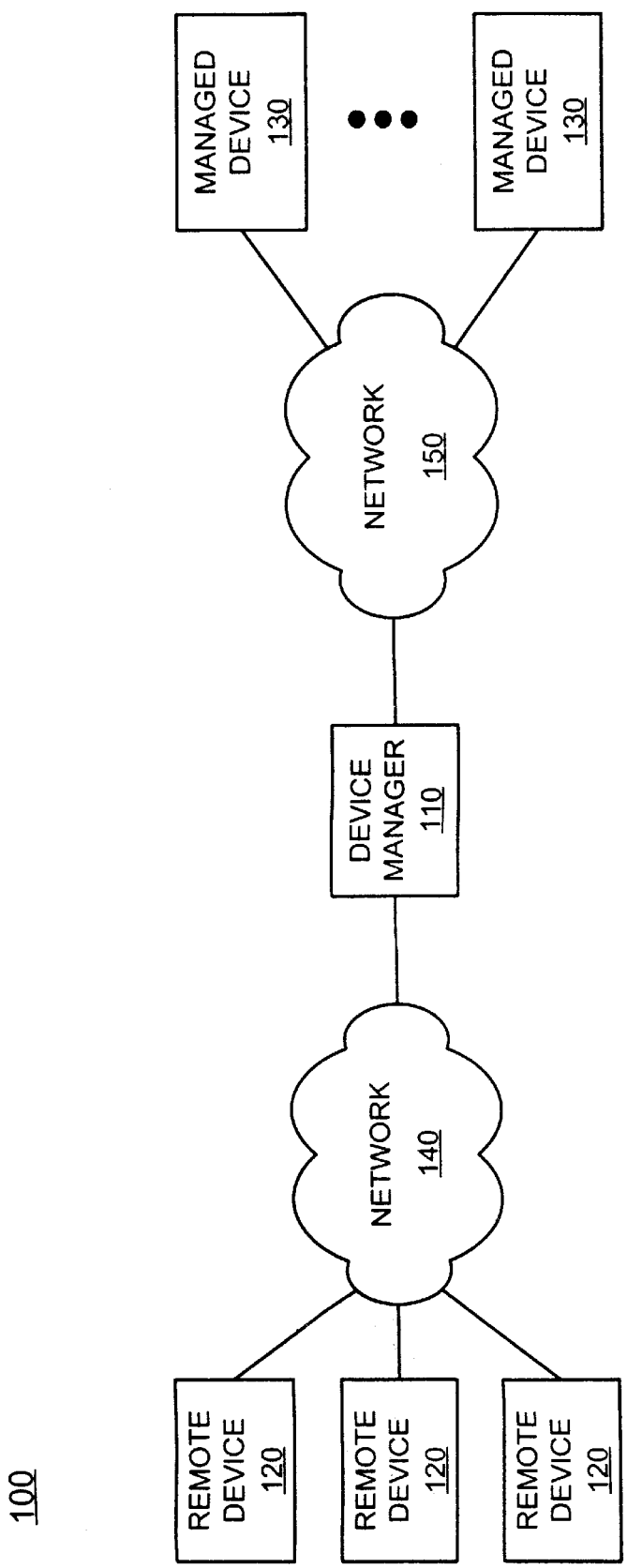
FIG. 1 is an exemplary diagram of a network in which systems and methods consistent with the present invention may be implemented.

FIG. 1 is a block diagram of an exemplary network 100 in which systems and methods consistent with the present invention may be implemented. The network 100 includes a device manager 110 connected to one or more remote devices 120 and one or more managed devices 130 via networks 140 and 150, respectively. The networks 140 and 150 may be the same network or separate networks and may include the Internet, an intranet, a wide area network (WAN), a local area network (LAN), or the like.

The remote devices 120 may include personal computers, lap tops, smart or dumb terminals, personal digital assistants (PDAs), or similar devices capable of communicating with the device manager 110 via the network 140. The managed devices 130 may include network resources or devices, such as routers, of possibly different types (e.g., produced by different vendors or different products from a particular vendor). The managed devices 130 may have different software configuration parameters and, therefore, may require vastly different commands to configure and manage them. Typically, a user (e.g., a customer) has limited knowledge of the different commands. The device manager 110 facilitates configuration and management of the managed devices 130.

Figure 2:
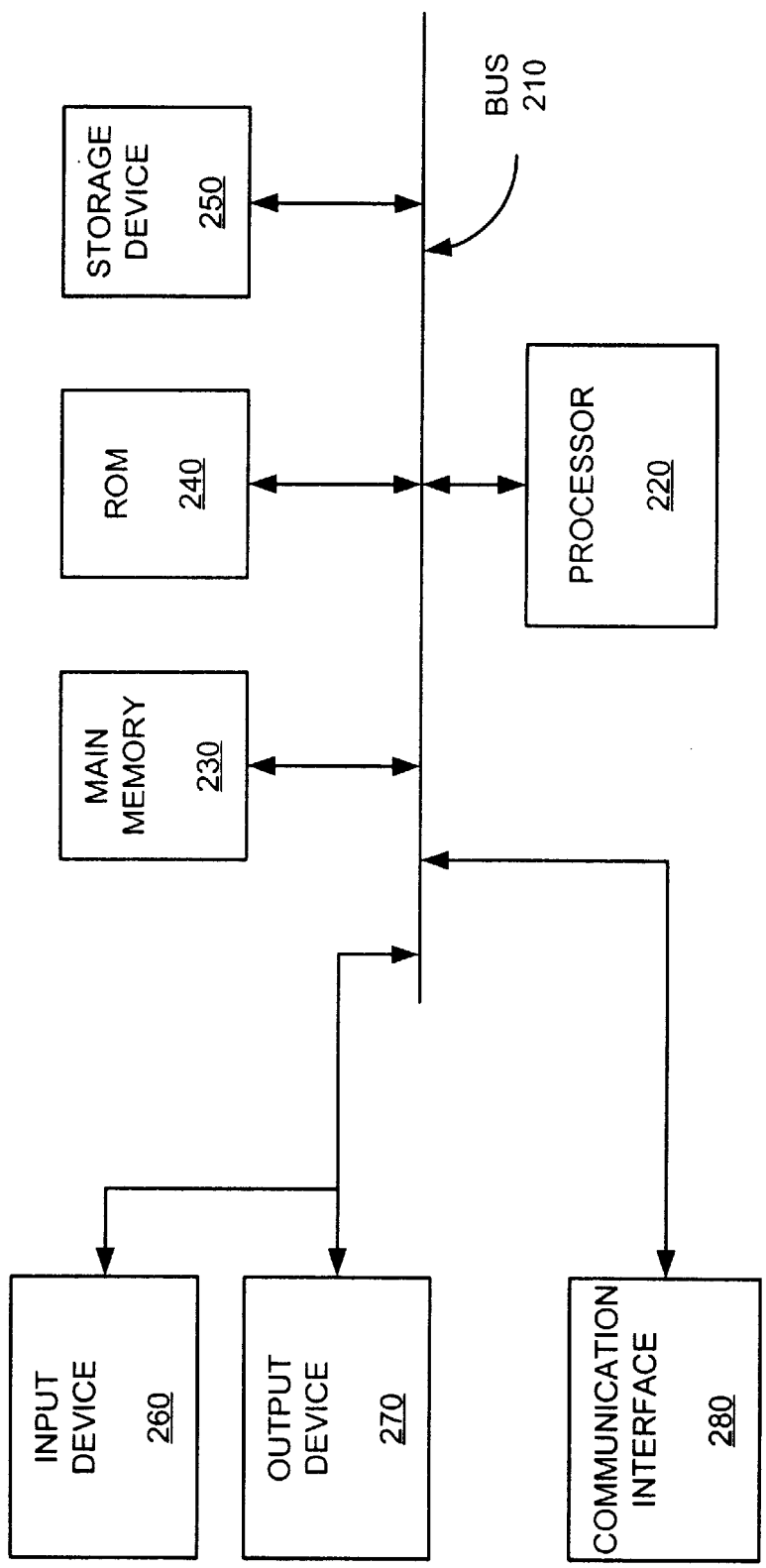
FIG. 2 is a detailed diagram of the device manager of FIG. 1.

FIG. 2 is an exemplary diagram of the device manager 110 in an implementation consistent with the present invention. The device manager 110 may include a bus 210, a processor 220, a main memory 230, a read only memory (ROM) 240, a storage device 250, an input device 260, an output device 270, and a communication interface 280. The bus 210 permits communication among the components of the device manager 110.

The processor 220 may include any type of conventional processor or microprocessor that interprets and executes instructions. The main memory 230 may include a random access memory (RAM) or another dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include any conventional mechanism that permits an operator to input information to the device manager 110, such as a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the device manager 110 to communicate with other devices and/or systems. For example, the communication interface 280 may include mechanisms for communicating with another device or system via a network, such as networks 140 and 150.

As will be described in detail below, a device manager 110, consistent with the present invention, provides a policy-driven protocol that facilitates the configuration and management of the managed devices 130. The device manager 110 performs this task in response to processor 220 operating upon software components contained in, for example, memory 230. The software components may be read into memory 230 from another computer-readable medium, such as the data storage device 250, or from another device via the communication interface 280.

The software components contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Software Components

Figure 3:
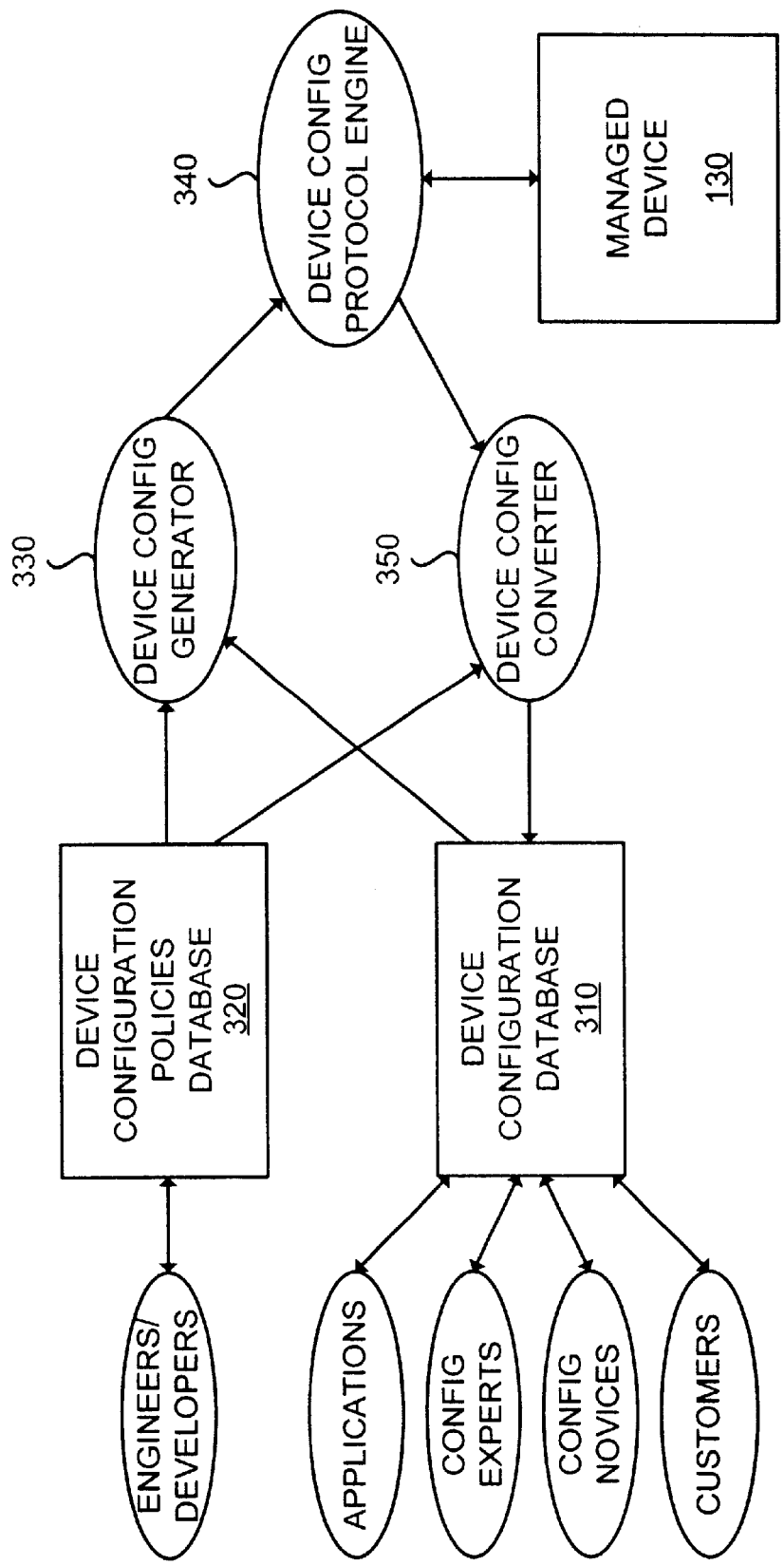
FIG. 3 is an exemplary diagram of software components used by the device manager of FIG. 1 in an implementation consistent with the present invention.

FIG. 3 is an exemplary diagram of software components used by the device manager 110 in an implementation consistent with the present invention. The software components may be stored in memory 230 or storage device 250, may be remotely stored and accessed by the device manager 110 via the communication interface 280, or some combination of these.

The software components may include device configuration database 310, device configuration policies database 320, device configuration generator 330, device configuration protocol engine 340, and device configuration converter 350. The device configuration database 310 stores information that defines the configuration of a managed device 130 in a device-type (or vendor) independent fashion. The device configuration database 310 includes data specific to the managed device 130, such as the interfaces that are configured for the managed device 130, the kinds of protocols (e.g., border gateway protocol (BGP), static, routing information protocol (RIP), etc.) that are to be used, and the like.

The device configuration database 310 interacts with several entities, such as customers, configuration novices, configuration experts, and applications. These entities may interact directly with the device manager 110 via the input and output devices 260 and 270 (FIG. 2) or remotely over the network 140 using, for example, the remote devices 120.

The customers may include persons who want to perform customer network management by electronically providing basic configuration data for simple configurations or who want to make simple configuration data changes, such as preventing access to a particular web site from their network. The configuration novices may include persons who enter the remaining device configuration data for simple configurations of new customers, who enter some of the remaining configuration data for complex configurations of new customers, or who make simple configuration changes for customers.

The configuration experts may include persons who enter all of the remaining device configuration data for complex configurations of new customers, who make complex configuration changes for customers, who enter device configuration data for devices that provide network capabilities, or who make configuration changes to alleviate problems or potential problems. The applications may include programs that obtain or provide historical or current device configuration data. The applications may include, for example, applications that manage particular types of data, such as configuration, performance, fault, accounting, and security data.

The policies database 320 includes rules that dictate how to build a configuration for a particular type of managed device 130. Typically, a managed device 130 can be configured in many different ways to satisfy a particular customer's or infrastructure's requirements. The policies database 320 dictates the manner of configuring a particular type of managed device 130 to satisfy the requirements provided by the device configuration database 310. The device configuration policies stored in the policies database 320 may change over time. There can be both type-dependent and type-independent device configuration policies.

The policies database 320 interacts with entities, such as engineers and developers. The engineers and developers may change the device configuration policies by which device configurations are built from the device configuration database 310.

The device configuration generator 330 receives inputs from both the device configuration database 310 and the policies database 320 to generate a deployable configuration for a managed device 130. The device configuration protocol engine 340 deploys the deployable configuration generated by the device configuration generator 330 to the managed device 130.

The device configuration converter 350 operates upon the rules in the policies database 320 corresponding to a particular managed device 130 to drive the device configuration database 31(0 based on the deployable configuration used by the device configuration protocol engine 340. The device configuration converter 350 may validate that a deployable configuration does not violate the device configuration policies in effect for a particular managed device 130; validate that configuration data from a deployable configuration matches the device configuration database 310 for the managed device 130; and/or update the device configuration database 310 to match the configuration data that was derived from the deployable configuration (i.e., obtain configuration data from the managed device 130 itself).

Exemplary Device Configuration Data

Figure 4:
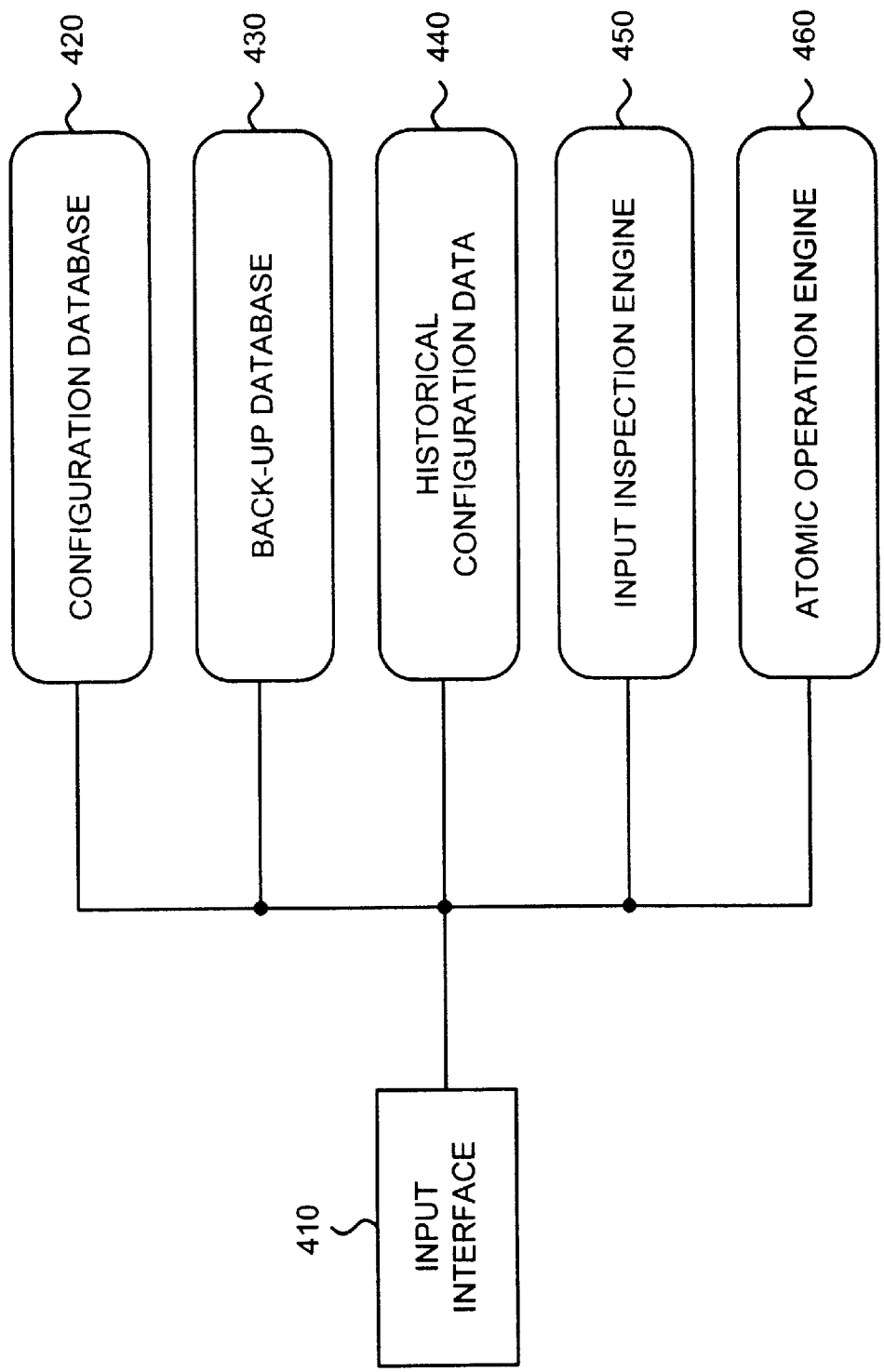
FIG. 4 is an exemplary diagram of the device configuration database in an implementation consistent with the present invention.

FIG. 4 is an exemplary diagram of the device configuration database 3110 in an implementation consistent with the present invention. The device configuration database 3110 may include an input interface 410, a configuration database 420, a back-up database 430, historical configuration data 440, an input inspection engine 450, and an atomic operation engine 460.

The input interface 410 interacts with external entities, such as customers, configuration novices and experts, and applications. The input interface 410 may authenticate the entities prior to permitting them access to the configuration database 420. The input interface 410 may present different user interfaces to the different types of entities. For example, for a customer or a configuration novice, the input interlace 410 may present a user interface that guides the user with regard to data entry (e.g., prompts the user, includes mandatory data entry fields, etc.); automatically provides defaults for parameters; and/or promptly reports an error regarding a particular entry and provides a meaningful reason for the error (e.g., "the routing protocol must be: RIP, static, or BGP"). The input interlace 410 may grant greater access and flexibility to configuration experts. Applications may access the input interface 410 via an application programming interface, such as the Common Object Request Broker Architecture (CORBA).

The configuration database 420 stores configuration data corresponding to one or more managed devices 130. The database 420 may store meta-data that describes the semantics of the kinds of configuration data in the database, the relationships between the configuration data in the database, the relationships between the configuration data and other data, such as topology data, device-specific configuration constraints (e.g., the maximum number of serial interfaces the managed device 130 supports), and permissible device configuration parameter values. The database 420 may segregate device-specific configuration data (e.g., constraints) from generic device configuration data (e.g., the IP address of a serial interface).

The back-up database 430 may store a duplicate copy of the configuration database 420 to prevent the loss of the configuration data when catastrophic failures occur. The back-up database 430 permits the configuration database 420 to be restored upon a loss of the data in the configuration database 420. The back-up database 430 may be located in a separate computer-readable medium from the configuration database 420 to prevent contamination of one from infecting the other.

The historical configuration data 440 archives prior device configuration data for a period of time to permit the device configuration data for a managed device 130 to be returned to a previous point in time. For any device configuration data that was ever deployed, deleted, changed, etc., the historical configuration data 440 stores information regarding when the deployment, deletion, change, and the like occurred. The device configuration database 310 may make the historical configuration data 440 accessible to external entities, such as external applications. For example, an application that performs performance management may need historical configuration parameters (e.g., bandwidth) to determine the correct utilization for a line because these parameters often change during the interval of time covered by a line utilization report.

The input inspection engine 450 validates inputs from external, entities, such as customers, configuration novices and experts, and applications. The input inspection engine 450 may perform validation checks to ensure that invalid data is not entered into the configuration database 420. For example, the input inspection engine 450 may prevent entry of a value outside the permitted range for a numeric parameter, an invalid choice for a multiple-choice parameter, etc. The input inspection engine 450 may also perform parameter cross checks to ensure that illegal combinations of data are not entered into the configuration database 420. For example, the input inspection engine 450 might prevent entry of the same address for both end points of a serial connection.

Further, the input inspection engine 450 may perform constraint checks to ensure that the device configuration database 420 does not contain data that exceeds permissible constraints. For example, the input inspection engine 450 might prevent an operator to configure more interfaces than are installed or are going to be installed on a managed device 130. If device configurations are not permitted to have four interfaces to a customer's network, for example, then the input inspection engine 450 prevents more than four interfaces to the customer's network from being configured regardless of the number of interfaces that are, or are going to be, installed on the managed device 130. The input inspection engine 450 may supply the results of its validations to applications, such as graphical user interfaces, for presentation to a user.

The atomic operation engine 460 permits a user to specify whether an update to the configuration database 420 with regard to one or more managed devices 130 should be performed in an atomic transaction (i.e., either all of the device configuration data is updated or none of it is updated). In other words, when enabled, the atomic operation engine 460 permits all or nothing changes to the configuration database 420.

Exemplary Device Configuration Policies Database

The device configuration policies in the policies database 320 dictate how to build a configuration for a particular type of managed device 130. Typically, a managed device 130 can be configured in many different ways to satisfy a particular customer's or the infrastructure's requirements. The device configuration policies dictate the manner of configuring a particular type of managed device 130 to satisfy the requirements specified by the device configuration database 310. The device configuration policies may change over time.

An infrastructure engineer or developer may standardize the policies database 320 for a particular type of managed device 130. The policies database 320 provides a user-friendly system for adding or modifying the device configuration policies. For example, the policies database 320 may permit infrastructure engineers and developers (hereinafter referred to generally as "engineers") to use statements from a device-specific language (e.g., Simple Network Management Protocol (SNMP)) to specify the configuration policies.

In addition, the policies database 320 may accept mnemonic names to represent device configuration database 310 values, instead of literal values, in policy statements. For example, the names SERIAL_ADDR and SERIAL_MASK might be used to refer to the values 199.94.220.82 and 255.255.255.252, respectively, in the policy statement:

ip address SERIAL_ADDR SERIAL_MASK for a particular type of managed device 130 (e.g., a Cisco router).

The policies database 320 permits an engineer to specify a device configuration policy that iterates over all objects (e.g., serial interfaces) for which the device configuration database 310 stores data that corresponds to an object of that type. For example, an engineer may use the statements:

```
foreach SERIAL_ADDR
    interface Serial SERIAL_ID
        ip address SERIAL_ADDR SERIAL_MASK
        o
        o
        o
``` to represent the device configuration policy for configuring the interface addresses/masks for all serial interfaces that have an address in the device configuration database 310 for a particular type of managed devices 130 (e.g., Cisco's routers).

The policies database 320 may permit engineers to specify the same device configuration policies for all objects of the same type that are used for a particular purpose or objects that belong to the same region, geographical area, etc. In other words, the policies database 320 permits conditional handling to be specified for all objects of a particular type that are used for a particular purpose or belong to the same region. For example, an engineer may use different device configuration policy statements, such as:

```
foreach SERIAL_ADDR
    interface Serial SERIAL_ID
        ip address SERIAL_ADDR SERIAL_MASK
        if POP_CONNECTION
            no fair-queue
        else if CPE_CONNECTION
            fair-queue
        end if
end foreach
``` to queue on serial interfaces used by point of presence (POP) connections as opposed to device configuration policies that queue on serial interfaces used by customer premises equipment (CPE) connections for a particular type of managed devices 130 (e.g., Cisco's routers). In this example, the device configuration policy for all serial interfaces used by POP connections use the no-fair-queue policy, and the device configuration policy for all serial interfaces used by CPE connections use the fair-queue policy. There is no queuing device configuration policy, in this example, for serial interfaces used for any other purpose.

The policies database 320 may permit engineers to specify device configuration policies that control the order in which the parameters for a particular object are configured. For example, an engineer may use the statements:

```
foreach SERIAL_ADDR
    interface Serial SERIAL_ID
        ip address SERIAL_ADDR SERIAL_MASK
        if POP_CONNECTION
            no fair-queue
        else if CPE_CONNECTION
            fair-queue
        end if
        no shutdown
end foreach
``` to configure the address and mask for a serial interface before the queuing policies-for the serial interface and the interface to be active (i.e., via the no shutdown statement) after the queuing policy for the interface have been configured.

Some vendors use standardized configuration languages across their entire product line that have some differences that depend on the hardware capabilities of the different products. For example, some vendors use hardware-dependent identifiers for products that have a fixed number of ports as opposed to products that may have a differing number of ports. The policies database 320 may permit the same device configuration policies to be used for all of these products.

For example, consider a case in which a vendor with a standardized configuration language across a number of products identified serial interfaces with the notation interface Serial port for some products, the notation interface Serial slot/port for some products, and the notation interface Serial slot/port-adaptor/port for some other products. For this example, an engineer may use SERIAL-ID in the statements:

```
foreach SERIAL_ADDR
    interface Serial SERIAL_ID
        o
        o
        o
``` to refer to a port (e.g., 0, 1, etc.), a slot/port (e.g., 0/0, 1/0, etc.), or a slot/port-adaptor/port (e.g., 0/0/0, 0/1/2, etc.) depending on which of the vendor's products was being configured.

The policies database 320 may permit references within device configuration policies-to other device configuration policies using mnemonic names to eliminate the need to replicate device configuration policies. For example, the statements:

```
foreach POP_CONNECTION
    include serial_interface.policy
    no fair-queue
endforeach
foreach CPE_CONNECTION
    include serial_interface.policy
    fair-queue
end foreach
``` use the same serial interface device configuration policies (which might contain an arbitrary number of device configuration policies) for both serial interfaces used for POP connections and serial interfaces used for CPE connections with the exception of the queuing device configuration policy.

The policies database 320 may also permit engineers to organize categories of device configuration policies in ways that are meaningful and convenient for them. For example, it may be more convenient to organize all the device configuration policies for interfaces into a single category for some devices, to organize all of the device configuration policies for each different type of interface (e.g., serial, Ethernet, etc.) into a type-specific category for other device types, and to have a hierarchical organization for the interface information for other device types.

Exemplary Device Configuration Generator

The device configuration generator 330 generates a device-specific configuration using information from the device configuration database 310 and the policies database 320 for deployment by the device configuration protocol engine 340. The device configuration generator 330 generates a full device-specific configuration or an incremental device-specific configuration, depending on the requirements for configuring the kind of managed device 130 (e.g., backbone router, customer router, etc.). An incremental device-specific configuration uses the differences between the current device configuration data and the new configuration data to generate a set of device-specific configuration commands that bring the managed device 130 in line with the new configuration.

To build a device-specific configuration, the device configuration generator 330 reads data from the device configuration database 310, constructs object inheritance and containment relationships among the data, prepares data referenced by variables in the policies database 320, and compiles the device configuration policies based on the prepared data to produce a deployable device-specific configuration. The deployable device-specific configuration drives the device configuration protocol engine 340 to configure the managed device 130.

To prepare data referenced by variables in the policies database 320, the device configuration generator 330 may:

(a) directly use data from the device configuration database 310. For example, the variable SERIAL_ADDR in a device configuration policy statement may directly refer to the value for the address of the serial interface stored in the device configuration database 310.

(b) perform simple transformations on data from the device configuration database 310. For example, the variable SERIAL_NET_ADDR in a device configuration policy statement may refer to the class-full IP network that contains the value for the address of the serial interface (e.g., a serial interface with the address 4.1.2.3 belongs to the class-full IP network 4.0.0.0).

(c) construct values from multiple elements of data from the device configuration database 310. For example, the variable SERIAL_SUBNET_ADDR in a device configuration policy statement may refer to the IP sub-network to which the serial interface connects or will connect. The device configuration generator 330 might access both the value of the interface's IP mask and the interface's IP address from the device configuration database 310 to prepare the value for this parameter.

(d) generate or use a list. For example, the device configuration generator 330 may use a list of all of the customer's networks for device configuration policies that involve packet filtering.

Since the variables to be prepared depend on the communication technology and protocols used by the managed devices 130, the device configuration generator 330 may operate in a table-driven fashion using configuration tables to specify how to derive the variables to drive the device configuration policies from the data in the device configuration database 310. Using table-driven technology enables the device configuration generator 330 to quickly adapt to emerging communication technologies.

Even if the current device configuration policies fail to use all of the variables that are appropriate to derive from the device configuration database 310, the configuration tables may contain a complete set of standard or default variables to eliminate the need to update the tables whenever engineers introduce new device configuration policies that need these variables. For example, the configuration tables may instruct the device configuration generator 330 to prepare the address, the class-full network address, the sub-network address, the network mask, and the host mask from the device configuration database 310 for the address and the network mask of a serial IP interface.

Exemplary Device Configuration Protocol Engine

The device configuration protocol engine 340 loads deployable device-specific configurations into the managed device 130, updates device-specific configurations that have already been deployed in the managed device 130, and reads the device-specific configuration information from the managed device 130.

The device configuration protocol engine 340 may use standard protocols (e.g., CORBA, SNMP, etc.) to deploy the device-specific configurations instead of using proprietary device-specific protocols. If an atomic configuration has been selected, then the device configuration protocol engine 340 either deploys an entire device-specific configuration to the managed device 130 or deploys none of the device-specific configuration. The device configuration protocol engine 340 may satisfy this all or nothing requirement even in situations in which communication, server, or device outages take place during deployment of the device-specific configuration.

Exemplary Device Configuration Converter

The device configuration converter 350 drives the device configuration database 310 from a device-specific configuration using the device configuration policies for the particular device-specific configuration. The device configuration converter 350 reports problems about a configuration that have been deployed to a managed device 130 that violates the device configuration policies in the policies database 320 that should be in effect for the managed device 130. For example, suppose that a Cisco IP router does not use the network engineering standard for access-list numbers used for interface packet filtering. Because Cisco access-list numbers have only local significance in the router, regenerating and redeploying the configuration would not affect the behavior of the Cisco router.

The device configuration converter 350 also determines mismatches between current data in the device configuration database 310 for a managed device 130 and the current configuration that is deployed in the managed device 130. The device configuration converter 350 processes a device-specific configuration and updates the device configuration database 310 to match the configuration data that was derived from the managed device 130, possibly as an atomic transaction.

Exemplary System Processing

Figure 5:
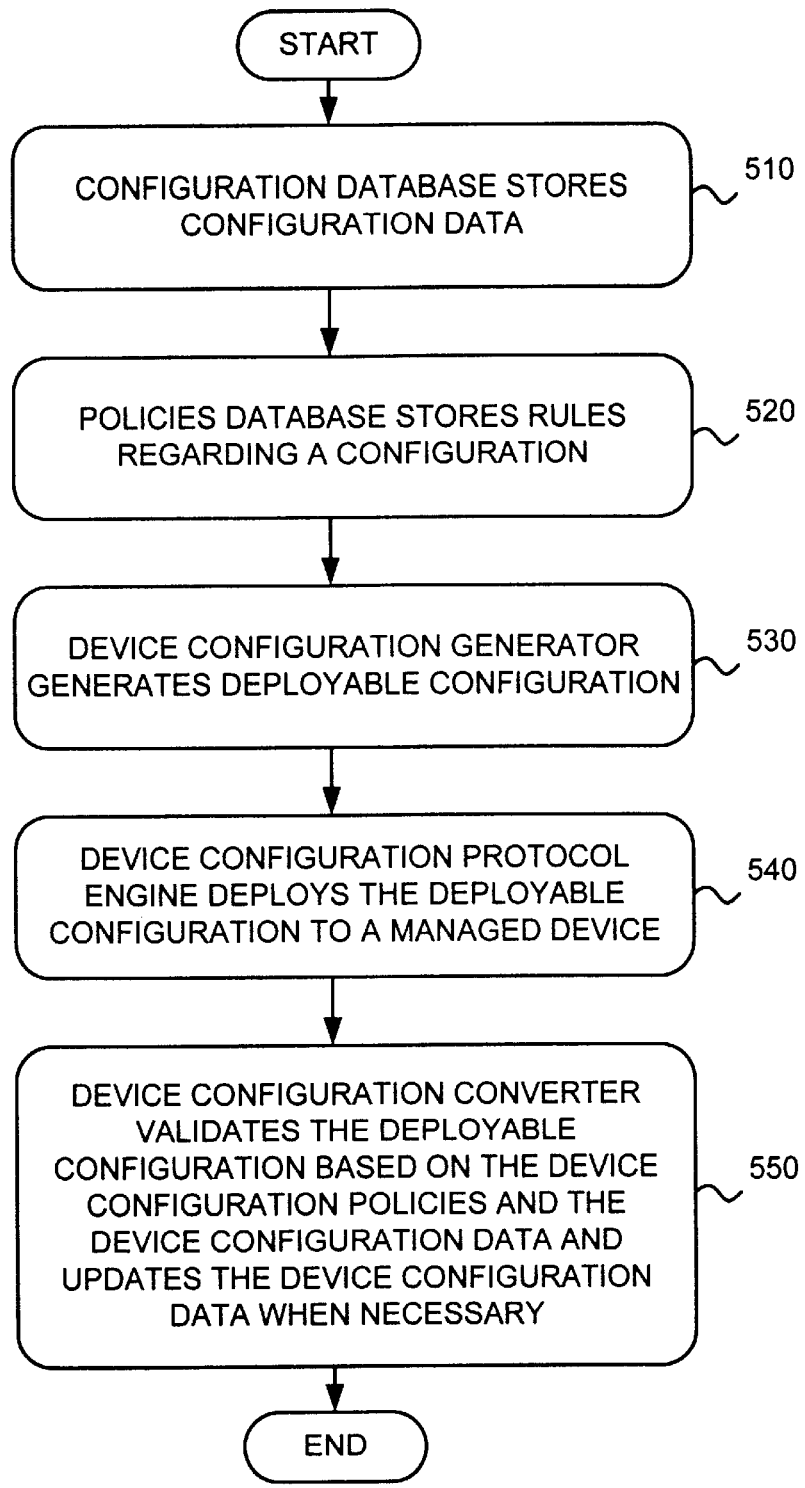
FIG. 5 is a flowchart of exemplary processing of the device manager for configuring a managed device in a manner consistent with the present invention.

FIG. 5 is a flowchart of exemplary processing of the device manager 110 for configuring a managed device 130 in a manner consistent with the present invention. The device configuration database 310 within the device manager 110 stores information that defines the configuration for the managed device 130 in a device-type (or vendor) independent fashion [step 510]. The device configuration database 310 may obtain the information from several entities, including, for example, customers, configuration novices and experts, and applications. These entities may 20 interact directly with the device manager 110 via the input and output devices 260 and 270 (FIG. 2) or remotely over the network 140 using one of the remote devices 120.

The policies database 320 stores rules that dictate how to build a configuration for the particular type of managed device 130 [step 520]. The policies database 320 may obtain the rules from several entities, including, for example, engineers and developers. The policies database 320 presents a user-friendly interface to the engineers and developers to permit them to add, change, or delete rules corresponding to the managed device 130.

The device configuration generator 330 receives inputs from both the device configuration database 310 and the policies database 320 to generate a deployable configuration for the managed device 130 [step 530]. The device configuration protocol engine 340 deploys the deployable configuration generated by the device configuration generator 330 to the managed device 130 [step 540].

The device configuration converter 350 operates upon rules in the policies database 320 that correspond to the managed device 130 to drive the device configuration database 310 based on the deployable configuration used by the device configuration protocol engine 340. The device configuration converter 350 may validate that a deployable configuration does not violate the device configuration policies in effect for the managed device 130; validate that configuration data from a deployable configuration matches data in the device configuration database 310 for the managed device 130; and/or update data in the device configuration database 310 to match the configuration data that was derived from the deployable configuration [step 550].

Conclusion

Systems and methods consistent with the present invention provide a standardized interface to network devices to permit the devices to be easily configured and managed.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A computer-implemented method for configuring a plurality of network devices of different types, comprising:

storing configuration information that defines configurations for each of the network devices in a device independent manner;

storing configuration policies for configuring each of the network devices;

generating deployable configurations from the stored configuration information and policies;

deploying the deployable configurations to the network devices;

comparing the deployable configurations to the stored configuration information; and determining whether the deployable configurations contradict the stored configuration information.

2. The method of claim 1, further comprising:

validating the deployable configurations based on the stored configuration policies.

3. The method of claim 1, further comprising:

updating the stored configuration information when the deployable configurations contradict the stored configuration information.

4. The method of claim 1, wherein the storing configuration information includes:

receiving the configuration information from at least one of a plurality of entities.

5. The method of claim 4, wherein the storing configuration information further includes:

validating the configuration information received from the entities.

6. The method of claim 1, wherein the storing configuration information includes:

storing at least one of device-specific configuration constraints and permissible device configuration parameter values corresponding to the network devices.

7. The method of claim 1, wherein the storing configuration policies includes:

storing information regarding how to configure each of the network devices.

8. The method of claim 1, wherein the generating includes:

generating one of a full device-specific configuration and an incremental device-specific configuration for each of the network devices.

9. The method of claim 1, wherein the generating includes:

retrieving data from the stored configuration information, constructing inheritance and containment relationships among the retrieved data, preparing ones of the retrieved data referenced by variables in the stored configuration policies, and compiling the stored configuration policies based on the prepared ones of the retrieved data to produce the deployable configurations.

10. The method of claim 9, wherein the preparing includes:

directly using the retrieved data.

11. The method of claim 9, wherein the preparing includes:

performing simple transformations on the retrieved data.

12. The method of claim 9, wherein the preparing includes:

constructing values from multiple ones of the retrieved data.

13. The method of claim 9, wherein the preparing includes:

using at least one configuration table to prepare the retrieved data.

14. The method of claim 1, wherein the deploying includes:

performing the deployment as an atomic transaction.

15. A system for configuring a plurality of network devices of different types, comprising:

means for storing configuration information that defines configurations for each of the network devices;

means for storing configuration policies for configuring each of the network devices;

means for generating deployable configurations from the stored configuration information and policies;

means for deploying the deployable configurations to the network devices;

means for comparing the deployable configurations to the stored configuration information; and means for determining whether the deployable configurations contradict the stored configuration information.

16. A system for configuring at least one of a plurality of network devices of different types, comprising:

a memory device that stores a data structure, including:

a configuration database that stores data that defines a configuration for the network device in a device-type independent manner, a policies database that stores rules for configuring the network device, a configuration generator that stores instructions for generating a deployable configuration from the data in the configuration database and the rules in the policies database, a protocol engine that stores instructions for deploying the deployable configuration to the network device, and a configuration converter that compares the deployable configuration to the data in the configuration database to determine whether the deployable configuration contradicts the data in the configuration database; and a processor that operates upon the data structure stored in the memory to configure the network device.

17. The system of claim 16, wherein the data structure further includes:

a configuration converter that validates the deployable configuration based on the rules in the policies database.

18. The system of claim 16, wherein the configuration converter is configured to update the data in the configuration database when the deployable configuration contradicts the data in the configuration database.

19. The system of claim 16, wherein the configuration database is configured to receive the data from at least one of a plurality of entities.

20. The system of claim 19, wherein the configuration database is further configured to validate the data received from the entities.

21. The system of claim 16, wherein the configuration database is configured to store at least one of device-specific configuration constraints and permissible device configuration parameter values corresponding to the network device.

22. The system of claim 16, wherein the policies database is configured to store policies regarding how to configure the network device.

23. The system of claim 16, wherein the configuration generator further stores instructions for generating one of a full device-specific configuration and an incremental device-specific configuration for the network device.

24. The system of claim 16, wherein the configuration generator further stores instructions for retrieving data from the configuration database, constructing inheritance and containment relationships among the retrieved data, preparing ones of the retrieved data referenced by variables in the policies database, and compiling the rules based on the prepared ones of the retrieved data to produce the deployable configuration.

25. The system of claim 24, wherein the configuration generator further stores instructions for directly using the retrieved data to prepare ones of the retrieved data.

26. The system of claim 24, wherein the configuration generator further stores instructions for performing simple transformations on the retrieved data to prepare ones of the retrieved data.

27. The system of claim 24, wherein the configuration generator further stores instructions for constructing values from multiple ones of the retrieved data to prepare ones of the retrieved data.

28. The system of claim 24, wherein the configuration generator further stores instructions for using at least one configuration table to prepare ones of the retrieved data.

29. The system of claim 16, wherein the protocol engine further stores instructions for performing the deployment as an atomic transaction.

30. A computer-readable medium storing a data structure operated upon by a processor to configure at least one of a plurality of network devices of different types, comprising:

a device configuration database configured to store data that defines a configuration for the network device;

a policies database configured to store rules for configuring the network device;

a configuration generator configured to store instructions for generating a deployable configuration from the data in the device configuration database and the rules in the policies database;

a configuration converter configured to store instructions for comparing the deployable configuration to the data in the device configuration database to determine whether the deployable configuration contradicts the data in the device configuration database; and a protocol engine configured to store instructions for deploying the deployable configuration to the network device.

31. The computer-readable medium of claim 30, wherein the device configuration database includes:

a configuration database configured to store at least one of device-specific configuration constraints and permissible device configuration parameter values, a back-up database configured to store a copy of the configuration database, and a historical configuration memory configured to store information regarding prior configurations of the network device.

32. The computer-readable medium of claim 30, wherein the device configuration database includes:

an input interface configured to receive data from at least one of a plurality of entities, and an input inspection engine configured to store instructions for validating the data received from the entities.

33. A system that configures at least one of a plurality of network devices of different types, comprising:

a configuration database configured to store information that defines a configuration for the network device;

a policies database configured to store rules for configuring the network device; and a processor configured to generate a deployable configuration from the information in the configuration database and the rules in the policies database, deploy the deployable configuration to the network device, and compare the deployable configuration to the information in the configuration database to determine whether the deployable configuration contradicts the information in the configuration database.

* * * * *